(12) United States Patent
Hosoi et al.

(10) Patent No.: US 11,269,493 B2
(45) Date of Patent: Mar. 8, 2022

(54) DISPLAY CONTROL DEVICE AND STORAGE MEDIUM

(71) Applicant: SEIKO EPSON CORPORATION, Tokyo (JP)

(72) Inventors: Toshiki Hosoi, Shiojiri (JP); Hiroyuki Nomizo, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/827,274

(22) Filed: Mar. 23, 2020

(65) Prior Publication Data
US 2020/0310604 A1 Oct. 1, 2020

(30) Foreign Application Priority Data
Mar. 25, 2019 (JP) .............................. JP2019-057192

(51) Int. Cl.
*G06F 3/0482* (2013.01)
*G06F 3/14* (2006.01)
*G06F 3/0485* (2022.01)

(52) U.S. Cl.
CPC .......... *G06F 3/0482* (2013.01); *G06F 3/0485* (2013.01); *G06F 3/1423* (2013.01)

(58) Field of Classification Search
CPC ......... G06F 3/04; A63F 13/212; A63F 13/219
See application file for complete search history.

(56) References Cited

U.S. PATENT DOCUMENTS

| | | | |
|---|---|---|---|
| 7,336,279 B1 | 2/2008 | Takiguchi | |
| 2007/0239771 A1* | 10/2007 | Shimizu | G06F 16/743 |
| 2015/0378526 A1* | 12/2015 | Ramanathan | G06F 3/04847 |
| | | | 715/841 |
| 2017/0124988 A1* | 5/2017 | Mitsui | G06F 3/04855 |

FOREIGN PATENT DOCUMENTS

JP H08-263255 10/1996

* cited by examiner

*Primary Examiner* — Peter D McLoone
(74) *Attorney, Agent, or Firm* — Workman Nydegger

(57) ABSTRACT

In a portion of a tile in a tiled menu, a tile arrangement thumbnail representing a tile arrangement image of a second-hierarchical-level tiled menu to be displayed when the tile is selected is displayed. When, among tiles included in a first-hierarchical-level tiled menu, any tile is selected, a second-hierarchical-level tiled menu corresponding to the selected tile is displayed.

6 Claims, 11 Drawing Sheets

FIG. 2

| TOP MENU | FIRST HIERARCHICAL LEVEL | SECOND HIERARCHICAL LEVEL | THIRD HIERARCHICAL LEVEL |
|---|---|---|---|
| SETTINGS | BASIC SETTINGS | SCREEN BRIGHTNESS SETTING | — |
| | | SOUND SETTING | MENU 31 |
| | | | MENU 32 |
| | | SETTING OF TRANSITION TIME PERIOD TO SLEEP | — |
| | | AUTOMATIC POWER-DOWN | — |
| | | GANGED ACTIVATION OF BREAKER | — |
| | | DATE/TIME SETTING | MENU 33 |
| | | | MENU 34 |
| | | KEYBOARD | — |
| | | LENGTH UNIT | — |
| | MENU 11 | MENU 21 | — |
| | | MENU 22 | — |
| | MENU 12 | MENU 23 | — |
| | | MENU 24 | — |
| MENU 01 | MENU 13 | MENU 25 | — |
| MENU 02 | MENU 14 | MENU 26 | — |

DISPLAY CONTROL DEVICE AND STORAGE MEDIUM

The present application is based on, and claims priority from JP Application Serial Number 2019-057192, filed Mar. 25, 2019, the disclosure of which is hereby incorporated by reference herein in its entirety.

BACKGROUND

1. Technical Field

The present disclosure relates to a display control device and a storage medium.

2. Related Art

In the related art, for example, JP-A-8-263255 discloses a technique in which, in a browser system that displays a hierarchy of a file system or database, file icons or data icons are displayed at varying sizes corresponding to depths of hierarchical levels thereof.

The technique disclosed in JP-A-8-263255 is not applicable to selection of a menu.

SUMMARY

According to an aspect of the present disclosure, a display control device includes a display unit configured to display, in a portion of a tile in a first-hierarchical-level tiled menu, a tile arrangement image of a second-hierarchical-level tiled menu to be displayed when the tile is selected; and a display control unit configured to, when any tile is selected from the first-hierarchical-level tiled menu, cause the display unit to display a second-hierarchical-level tiled menu corresponding to the selected tile.

According to an aspect of the present disclosure, a display control device includes a display unit configured to display a first screen that displays a first button serving as one button, a second screen, and a third screen; and a display control unit configured to, when a first region that is a portion of a button region of the first button is selected in the first screen, cause the display unit to display the second screen and configured to, when a second region that is a portion of the button region of the first button and differs from the first region is selected in the first screen, cause the display unit to display the third screen.

According to an aspect of the present disclosure, a non-transitory computer-readable storage medium stores a program for causing a computer to execute a process. The process includes displaying, in a portion of a tile in a first-hierarchical-level tiled menu, a tile arrangement image of a second-hierarchical-level tiled menu to be displayed when the tile is selected; and displaying, when any tile is selected from the first-hierarchical-level tiled menu, a second-hierarchical-level tiled menu corresponding to the selected tile.

According to an aspect of the present disclosure, a non-transitory computer-readable storage medium stores a program for causing a computer to execute a process. The process includes displaying a first screen that displays a first button serving as one button; and displaying a second screen when a first region that is a portion of a button region of the first button is selected in the first screen and displaying a third screen when a second region that is a portion of the button region of the first button and differs from the first region is selected in the first screen.

BRIEF DESCRIPTION OF THE DRAWINGS

FIG. 2 illustrates a menu storage region.

DESCRIPTION OF EXEMPLARY EMBODIMENTS

Figure 1:
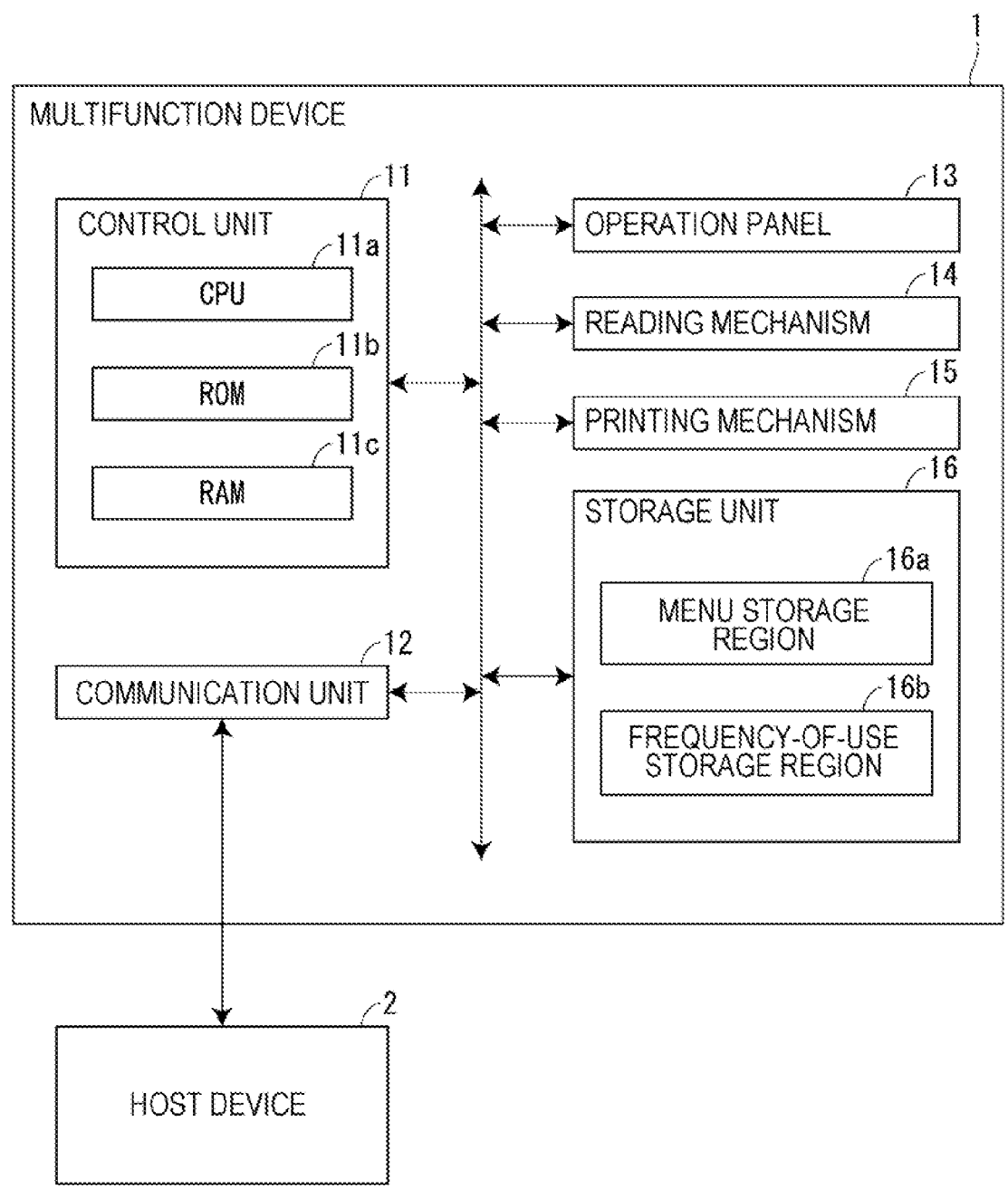
FIG. 1 is a block diagram illustrating a hardware configuration of a multifunction device.

A display control device and a program according to an embodiment will be described below with reference to the accompanying drawings. FIG. 1 is a block diagram illustrating a hardware configuration of a multifunction device 1. The multifunction device 1 is an example of "display control device". The multifunction device 1 according to the embodiment is intended to be a multifunction peripheral (MFP) having a copy function, a scanner function, and a print function.

As illustrated in FIG. 1, the multifunction device 1 includes a control unit 11, a communication unit 12, an operation panel 13, a reading mechanism 14, a printing mechanism 15, and a storage unit 16. The operation panel 13 is an example of "display unit". Furthermore, the control unit 11 is an example of "display control unit" and "computer".

The control unit 11 includes a central processing unit (CPU) 11a, a read only memory (ROM) 11b, and a random access memory (RAM) 11c, and controls elements included in the multifunction device 1. The CPU 11a loads a control program stored in the ROM 11b into the RAM 11c and performs various arithmetic processes. The control program is an example of "program".

The control unit 11 may use a processor other than the CPU 11a. For example, the processor may be a hardware circuit, such as an application specific integrated circuit (ASIC), or a configuration may be provided in which one or more CPUs and a hardware circuit, such as an ASIC, operate cooperatively with each other.

The communication unit 12 communicates with a host device 2. For example, the communication unit 12 transmits image data read by the reading mechanism 14 to the host device 2. Furthermore, the communication unit 12 receives, from the host device 2, print data for performing printing in the printing mechanism 15. The host device 2 is intended to be an information processing device, such as a personal computer (PC) or tablet.

The operation panel 13 receives various operations from a user and also presents various pieces of information to the user. In the embodiment, the operation panel 13 mainly displays a settings menu screen D1 (see, for example, FIG. 3) and a basic settings menu screen D2 (see, for example, FIG. 6) and is used to receive selection operations for various menus. In the embodiment, a selection operation refers to an operation of touching the operation panel 13. Furthermore, an operating tool with which a selection operation is performed is any type of tool, such as a finger or pen.

The reading mechanism 14 reads image data from a document placed on a reading table. The reading mechanism 14 includes a light source that irradiates the document with light, a lens array that captures light reflected from the document, an image sensor that converts an output of the lens array into an electrical signal, and so forth. Incidentally, the reading mechanism 14 is used for the copy function or scanner function of the multifunction device 1.

The printing mechanism 15 is a mechanism that performs printing on a print medium, such as copy paper. For example, in the case of an ink jet system, the printing mechanism 15 includes an ink jet head, a head drive mechanism that drives the ink jet head, a print medium transport mechanism that transports a print medium, and so forth. Furthermore, for example, in the case of a laser system, the printing mechanism 15 includes a laser light source, a transfer mechanism, a print medium transport mechanism that transports a print medium, and so forth. Incidentally, the printing mechanism 15 is used for the copy function or print function of the multifunction device 1.

The storage unit 16 is, for example, a flash memory and includes a menu storage region 16a and a frequency-of-use storage region 16b. The menu storage region 16a stores menus classified according to hierarchy. Furthermore, the frequency-of-use storage region 16b stores a frequency of use of each menu included in the menu storage region 16a.

FIG. 2 illustrates the menu storage region 16a. In the multifunction device 1 according to the embodiment, a three-level hierarchical menu is employed, but it goes without saying that the number of hierarchical levels may be two or four or more. In a top menu, there are included three menus: a "settings" menu, "menu 01", and "menu 02". Examples of "menu 01" and "menu 02" include "copy menu" in which settings for the copy function are set, "scan menu" in which settings for the scanner function are set, and "print menu" in which settings for the print function are set. Furthermore, the "settings" menu is a menu for setting settings for setting items not limited to specific functions, such as the copy function, the scanner function, and the print function.

The multifunction device 1 includes, in a subsequent hierarchical level of the "settings" menu, that is, in a low hierarchical level below the "settings" menu, three menus: a "basic settings" menu, "menu 11", and "menu 12". A menu of this hierarchical level is hereinafter referred to as "first-hierarchical-level menu".

Furthermore, the multifunction device 1 includes, in a subsequent hierarchical level of the "basic settings" menu, eight menus: a "screen brightness setting" menu, a "sound setting" menu, a "setting of transition time period to sleep" menu, an "automatic power-down" menu, a "ganged activation of breaker" menu, a "date/time setting" menu, a "keyboard" menu, and a "length unit" menu. A menu of this hierarchical level is hereinafter referred to as "second-hierarchical-level menu".

Furthermore, the multifunction device 1 includes, in a subsequent hierarchical level of the "sound setting" menu, "menu 31" and "menu 32", and includes, in a subsequent hierarchical level of the "date/time setting" menu, "menu 33" and "menu 34". A menu of this hierarchical level is hereinafter referred to as "third-hierarchical-level menu".

In a list of menus illustrated in FIG. 2, a sign of a hyphen "-" denotes that there is no menu in the corresponding hierarchical level. Furthermore, FIG. 2 illustrates an example of a menu structure, and menu details, the number of menus, a hierarchy, and so forth are not limited to the example.

Figure 3:
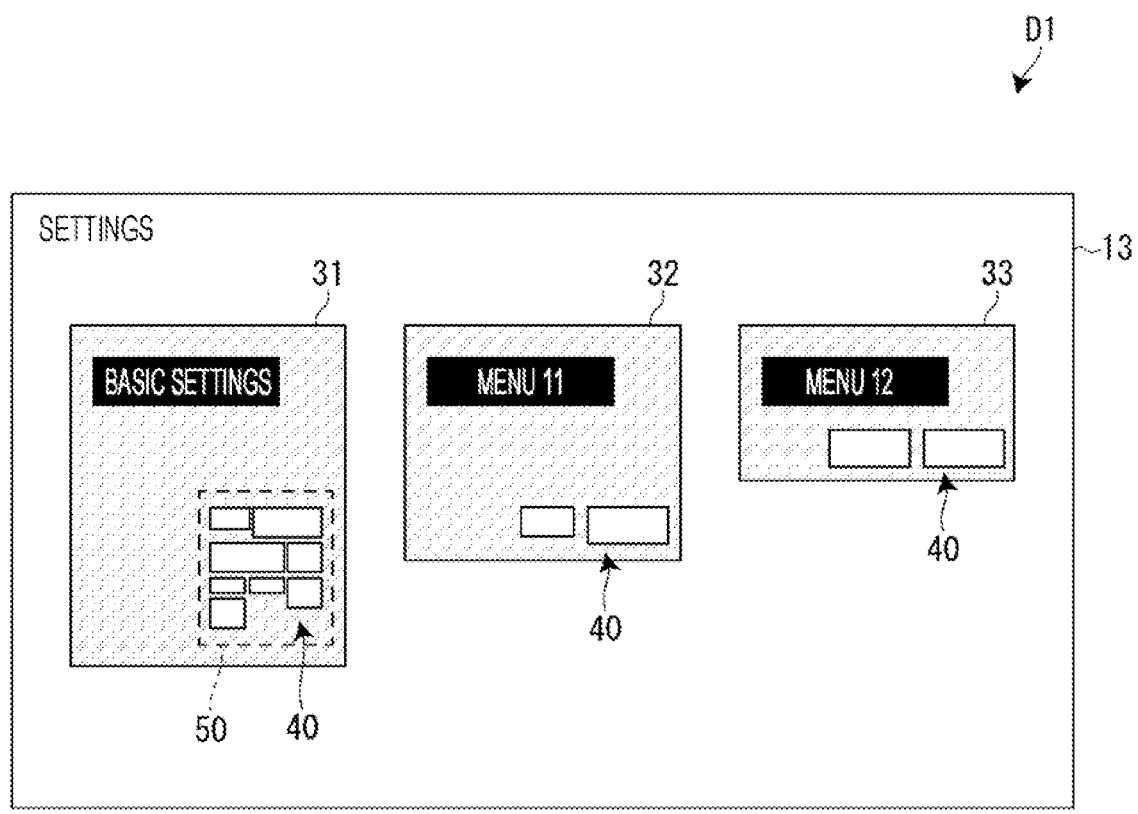
FIG. 3 illustrates an example of a display of a settings menu screen.

Next, a display provided by the operation panel 13 and a method of operating the operation panel 13 will be described with reference to FIGS. 3 to 7. In these drawings, a vertical direction is referred to as a Y direction, and a horizontal direction is referred to as an X direction. FIG. 3 illustrates an example of a display of the settings menu screen D1 that displays the "settings" menu. The settings menu screen D1 is a screen displayed when the "settings" menu is selected from the top menu.

As described above, the "settings" menu includes three menus: the "basic settings" menu, "menu 11", and "menu 12". As illustrated in FIG. 3, each of the menus can be selected by using a rectangular button. This rectangular button is hereinafter referred to as "tile". Furthermore, a menu in which such "tiles" are arranged is referred to as "tiled menu".

Incidentally, the control unit 11 of the multifunction device 1 displays each tile at a size based on a frequency of use of a menu corresponding to the tile. The size of the tile is determined so that, as the frequency of use increases, a region of the tile increases, that is, a tile area increases. FIG. 3 illustrates the case where, among three menus: the "basic settings" menu, "menu 11", and "menu 12", the ranking of the frequency of use, from highest to lowest, is the "basic settings" menu, "menu 11", and "menu 12". Hence, the tile area decreases in the order of a tile 31 of the "basic settings" menu, a tile 32 of "menu 11", and a tile 33 of "menu 12".

Incidentally, when, for example, the "settings" menu is selected, the control unit 11 calculates a frequency of use of each menu by referring to a storage region, which is not illustrated, storing a selection history for the menu and determines a tile area in accordance with this frequency of use. Furthermore, the control unit 11 updates the frequency-of-use storage region 16b in accordance with a calculated frequency of use of each menu. Furthermore, a frequency of use of each menu may be obtained from a cumulative total of the number of times the menu has been selected since shipment of the multifunction device 1 from a factory or may be obtained from the number of times the menu has been selected in a certain time period in the past.

Furthermore, the control unit 11 displays, in a portion of each tile, a menu name of a menu corresponding to the tile. When a tile area of a tile is smaller than a predetermined area because a frequency of use of a menu corresponding to the tile is low, the control unit 11 omits displaying a menu name. The control unit 11 does not omit displaying the menu name but may reduce a font size of the menu name or may display only a portion of the menu name.

Furthermore, the control unit 11 displays, in a portion of each tile in a tiled menu displayed on the settings menu screen D1, a tile arrangement image of a subsequent hierarchical level of a menu corresponding to the tile. This "tile arrangement image" is hereinafter referred to as "tile arrangement thumbnail". Furthermore, in the tile, a region in which "tile arrangement thumbnail" is displayed is referred to as "thumbnail region".

In FIG. 3, for example, in a thumbnail region 50 in the tile 31 of the "basic settings" menu, a tile arrangement thumbnail 40 of the subsequent hierarchical level of the "basic settings" menu is displayed. In FIG. 3, although the thumbnail region 50 is represented by a dashed line, the dashed line is illustrated for the sake of convenience and is not actually displayed on the operation panel 13. Furthermore, in FIG. 3, in the tile 32 of "menu 11", a tile arrangement thumbnail 40 of a subsequent hierarchical level of "menu 11" is displayed. Similarly, in the tile 33 of "menu 12", a tile arrangement thumbnail 40 of a subsequent hierarchical level of "menu 12" is displayed.

Thus, in the multifunction device 1, in each tile, a tile arrangement thumbnail 40 of a subsequent hierarchical level of a menu corresponding to the tile is displayed, and the user can therefore select the menu by using not only a menu name displayed in the tile but also the tile arrangement thumbnail 40.

Figure 4:
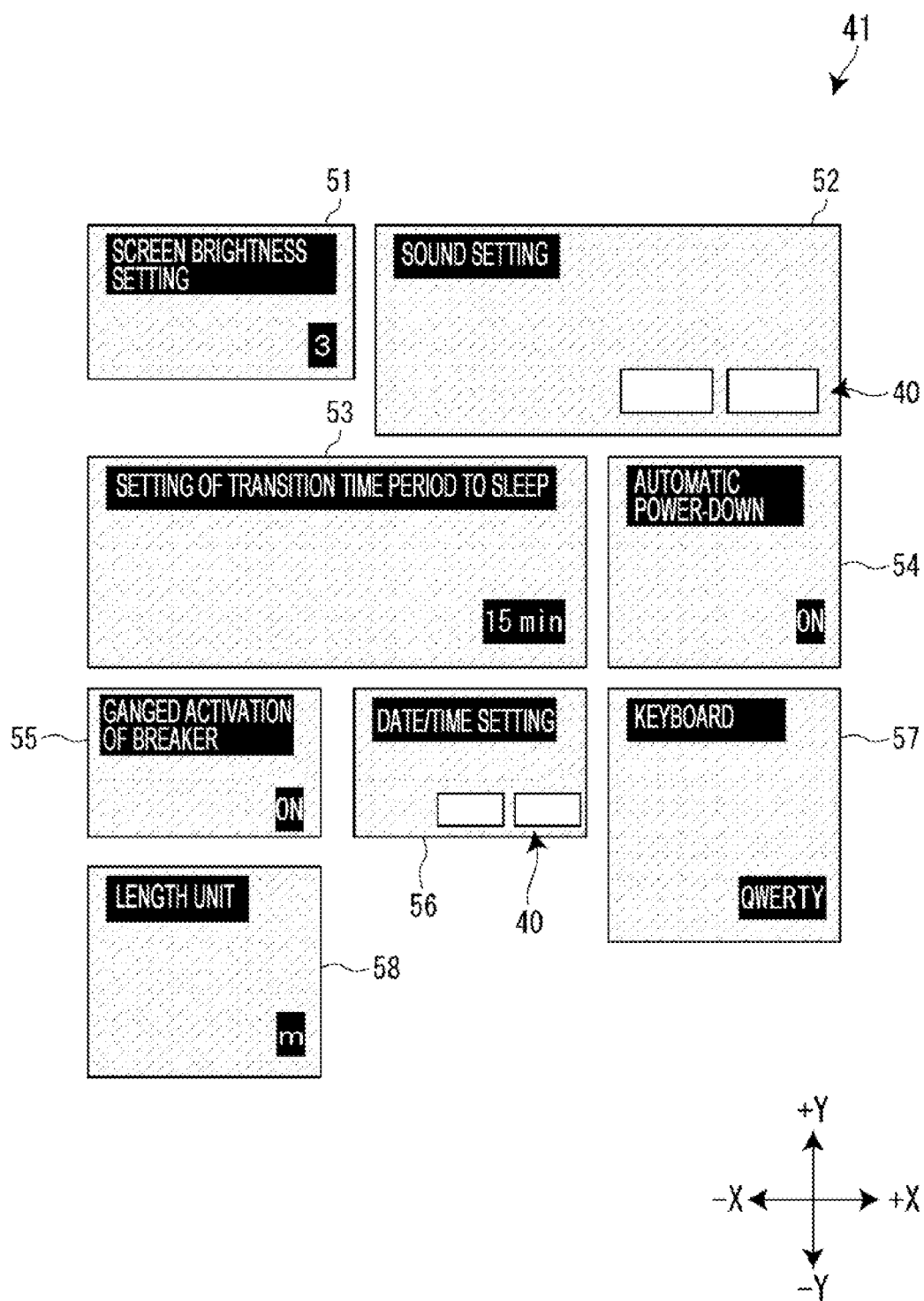
FIG. 4 illustrates an example of a tile arrangement of a "basic settings" menu.

Furthermore, with respect to a tile arrangement thumbnail 40 as well, the control unit 11 displays each tile at a size based on a frequency of use of a menu corresponding to the tile. FIG. 4 illustrates a tile arrangement 41 of the "basic settings" menu to which a transition is made when the tile 31 of the "basic settings" menu is selected. The tile arrangement 41 of the "basic settings" menu illustrated in FIG. 4 corresponds to an arrangement of tiles in the tile arrangement thumbnail 40 illustrated in FIG. 3 and also corresponds to an arrangement of tiles 51 to 58 in the basic settings menu screen D2 (see FIGS. 6 and 7) that displays the "basic settings" menu. Dimensional ratios of these tiles do not have to be in agreement on all dimensions, and may be slightly different as long as the user can have an impression that they are equal.

The control unit 11 displays, on the basic settings menu screen D2, eight tiles 51 to 58 corresponding to the eight menus (see FIG. 2) of a second hierarchical level that is the subsequent hierarchical level of the "basic settings" menu. As described above, on the basic settings menu screen D2 as well, the control unit 11 displays each tile at a size based on a frequency of use of a menu corresponding to the tile.

Furthermore, on the basic settings menu screen D2 as well, the control unit 11 displays, in a portion of each tile, a menu name of a menu corresponding to the tile. Furthermore, on the basic settings menu screen D2 as well, the control unit 11 displays, with respect to a tile that has a subsequent hierarchical-level menu, a tile arrangement thumbnail 40 of a menu corresponding to the tile. For example, the control unit 11 displays, in the tile 52 of the "sound setting" menu, a tile arrangement thumbnail 40 of the subsequent hierarchical level of the "sound setting" menu. Furthermore, the control unit 11 displays, in the tile 56 of the "date/time setting" menu, a tile arrangement thumbnail 40 of the subsequent hierarchical level of the "date/time setting" menu. With respect to the tile arrangement thumbnails 40 as well that are displayed in the tile 52 of the "sound setting" menu and in the tile 56 of the "date/time setting" menu, each tile is displayed at a size based on a frequency of use of a menu corresponding to the tile.

Furthermore, with respect to a tile corresponding to a menu having no subsequent hierarchical level, the control unit 11 displays, in a portion of the tile, a setting of the menu. For example, the control unit 11 displays, in the tile 51 of the "screen brightness setting" menu, a setting "3" of the "screen brightness setting" menu and displays, in the tile 53 of the "setting of transition time period to sleep" menu, a setting "15 min" of the "setting of transition time period to sleep" menu.

Incidentally, the control unit 11 varies a tile area of each tile in the settings menu screen D1 or basic settings menu screen D2 in accordance with a frequency of use of a menu corresponding to the tile, but does not hide a tile of a menu even if the menu has not been used at all. That is, the control unit 11 does not change the number of tiles displayed on each menu screen.

Incidentally, when a tile has a subsequent hierarchical level and a tiled menu of the subsequent hierarchical level (hereinafter referred to as a subsequent hierarchical-level tiled menu) has to be subjected to a scroll operation to display all tiles, the control unit 11 changes, in accordance with a selected position in the thumbnail region 50 of the tile, a display of the subsequent hierarchical-level tiled menu. Specifically, the control unit 11 causes, in accordance with a selected position in the thumbnail region 50 of the tile, the operation panel 13 to display the subsequent hierarchical-level tiled menu scrolled to a position corresponding to the selected position.

In the embodiment, in the basic settings menu screen D2, there is provided a scroll bar 85 extending along the Y direction of the basic settings menu screen D2. Furthermore, the basic settings menu screen D2 can be scrolled in a direction of +Y by moving an operating element 85a in the scroll bar 85 in a direction of −Y, and the basic settings menu screen D2 can be scrolled in the direction of −Y by moving the operating element 85a in the direction of +Y. An operation of moving the operating element 85a in the scroll bar 85 in the Y direction is referred to as "scroll operation".

Figure 5:
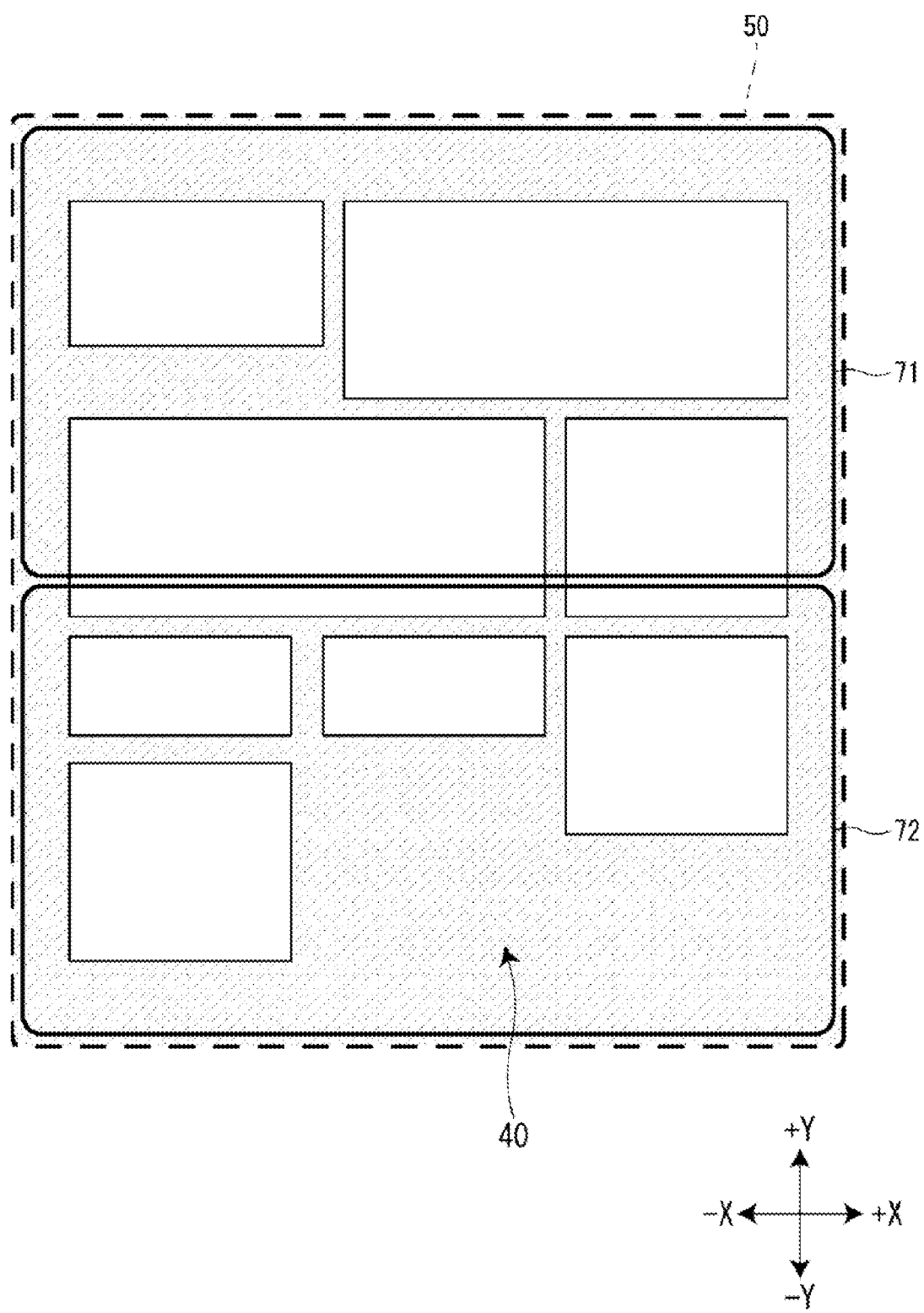
FIG. 5 is an enlarged view of a thumbnail region of a tile of the "basic settings" menu.
Figure 6:
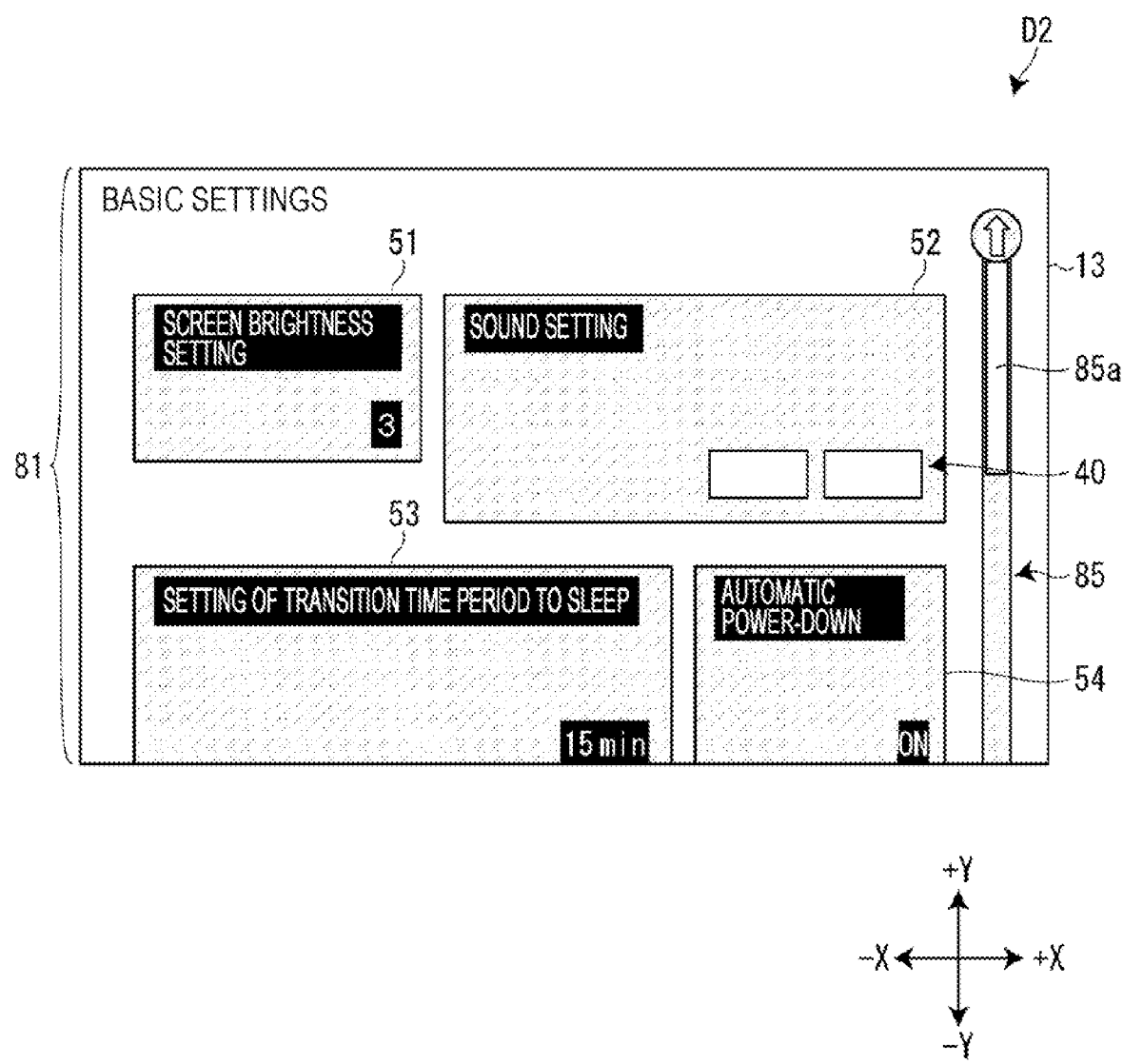
FIG. 6 illustrates an example of a display of a first menu region of a basic settings menu screen.

FIG. 5 is an enlarged view of the thumbnail region 50 of the tile 31 (see FIG. 3) of the "basic settings" menu. When this thumbnail region 50 is divided into two in the Y direction, a region on a +Y side is referred to as a first thumbnail region 71, and a region on a −Y side is referred to as a second thumbnail region 72. When a certain position in the first thumbnail region 71 of the thumbnail region 50 is selected, the control unit 11 causes the operation panel 13 to display a first menu region 81 of the basic settings menu screen D2 as illustrated in FIG. 6. Furthermore, when a certain position in the second thumbnail region 72 of the thumbnail region 50 is selected, the control unit 11 causes the operation panel 13 to display a second menu region 82 of the basic settings menu screen D2 as illustrated in FIG. 7.

In the embodiment, the tile 31 of the "basic settings" menu is an example of "first button". Furthermore, the first thumbnail region 71 is an example of "first region", and the second thumbnail region 72 is an example of "second region". Furthermore, the settings menu screen D1 (see FIG. 3) that displays the tile 31 of the "basic settings" menu is an example of "first screen". Furthermore, the first menu region 81 of the basic settings menu screen D2 is an example of "second screen", and the second menu region 82 of the basic settings menu screen D2 is an example of "third screen".

As illustrated in FIG. 6, when an inner portion of the first thumbnail region 71 of the thumbnail region 50 is selected, the control unit 11 displays the basic settings menu screen D2 scrolled to a position corresponding to the first thumbnail region 71 that is a user-selected position. In this case, the operating element 85a of the scroll bar 85 is located, for example, at an end on the +Y side of the scroll bar 85. Among the tiles included in the tile arrangement 41 of the "basic settings" menu illustrated in FIG. 4, the tiles 51 to 54 arranged on the +Y side are displayed on the operation panel 13.

Figure 7:
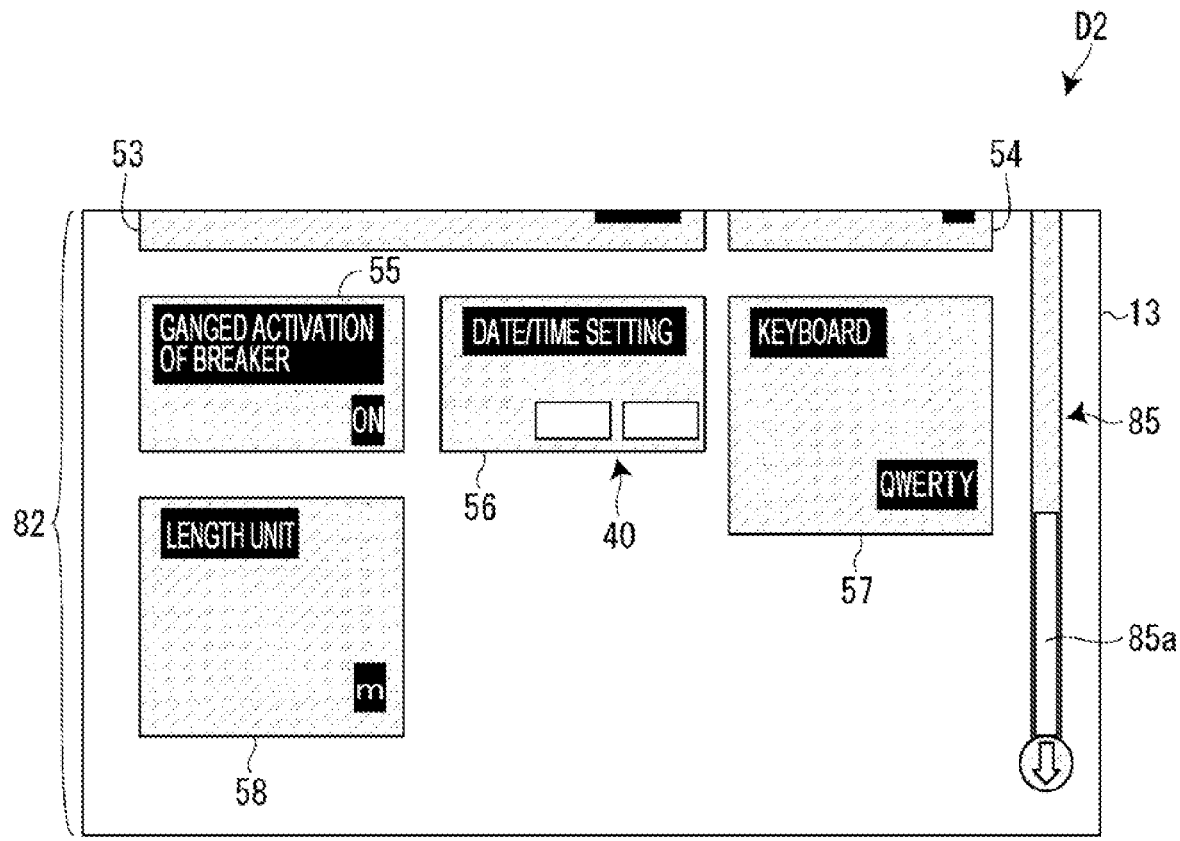
FIG. 7 illustrates an example of a display of a second menu region of the basic settings menu screen.

On the other hand, as illustrated in FIG. 7, when an inner portion of the second thumbnail region 72 of the thumbnail region 50 is selected, the control unit 11 displays the basic settings menu screen D2 scrolled to a position corresponding to the second thumbnail region 72 that is a user-selected position. In this case, the operating element 85a of the scroll bar 85 is located, for example, at an end on the −Y side of the scroll bar 85. Among the tiles included in the tile arrangement 41 of the "basic settings" menu illustrated in FIG. 4, the tiles 55 to 58 arranged on the −Y side are displayed on the operation panel 13.

Figure 8:
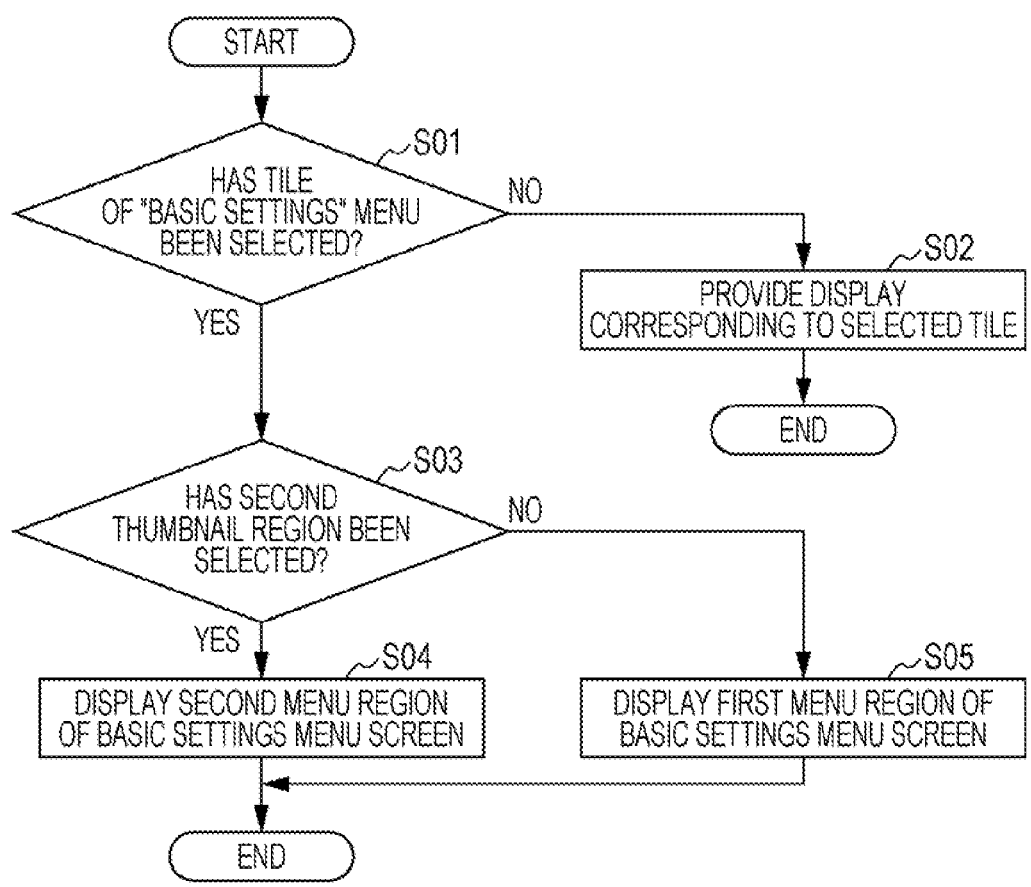
FIG. 8 is a flowchart illustrating a process involved in selection of the tile of the "basic settings" menu.

Next, a flow of a process involved in selection of the tile 31 of the "basic settings" menu will be described with reference to a flowchart of FIG. 8. When a portion of any tile is touched in the settings menu screen D1, the control unit 11 provides an animation indicating that the whole of the tile has been touched. When the touch is removed shortly thereafter, the control unit 11 recognizes the tile as a selected tile, provides an animation indicating that the touch of the whole of the tile has been removed, and starts the flowchart of FIG. 8.

The control unit 11 determines whether the tile 31 of the "basic settings" menu has been selected in the settings menu screen D1 (S01). When a tile other than the tile 31 of the "basic settings" menu is selected in the settings menu screen D1 (S01: No), the control unit 11 provides a display corresponding to the selected tile (S02). In S02, a subsequent hierarchical-level tiled menu of a menu corresponding to the selected tile is displayed.

When the tile 31 of the "basic settings" menu is selected in the settings menu screen D1 (S01: Yes), the control unit 11 determines whether the second thumbnail region 72 has been selected (S03). That is, the control unit 11 determines whether a user-selected position is included in the second thumbnail region 72. When the control unit 11 determines that the second thumbnail region 72 has been selected (S03: Yes), the control unit 11 displays the second menu region 82 of the basic settings menu screen D2 (S04) as illustrated in FIG. 7.

Furthermore, when the control unit 11 determines that the second thumbnail region 72 has not been selected (S03: No), the control unit 11 displays the first menu region 81 of the basic settings menu screen D2 (S05) as illustrated in FIG. 6. Incidentally, the case where it is determined that the second thumbnail region 72 has not been selected (S03: No) includes both of the case where the first thumbnail region 71 has been selected and the case where, among regions in the tile 31 of the "basic settings" menu, a region other than the thumbnail region 50 has been selected.

As described above, in the multifunction device 1 according to the embodiment, the tile arrangement thumbnail 40 representing a tile arrangement image of the subsequent hierarchical level of the "basic settings" menu is displayed in a portion of the tile 31 of the "basic settings" menu included in a first-hierarchical-level tiled menu, and the user can therefore select, in an operation of making a transition from a first hierarchical level to the second hierarchical level, the tile by using the tile arrangement thumbnail 40 displayed in the tile. Thus, in recognizing a present menu hierarchical level or visualizing an operation path to an intended menu, the user can use not only character elements, such as a menu name, but also graphic elements that can be visualized intuitively, and operability can be expected to be improved.

Furthermore, the multifunction device 1 can cause, in accordance with a selected position in the thumbnail region 50 of the tile 31 of the "basic settings" menu, the basic settings menu screen D2 scrolled to a position corresponding to the selected position to appear. For this reason, the user can cause, by changing a selected position in the thumbnail region 50, a desired position to which the basic settings menu screen D2 is scrolled to appear quickly.

The present disclosure is not limited to the above-described embodiment, and the following modifications can be employed.

Modification 1

Figure 9:
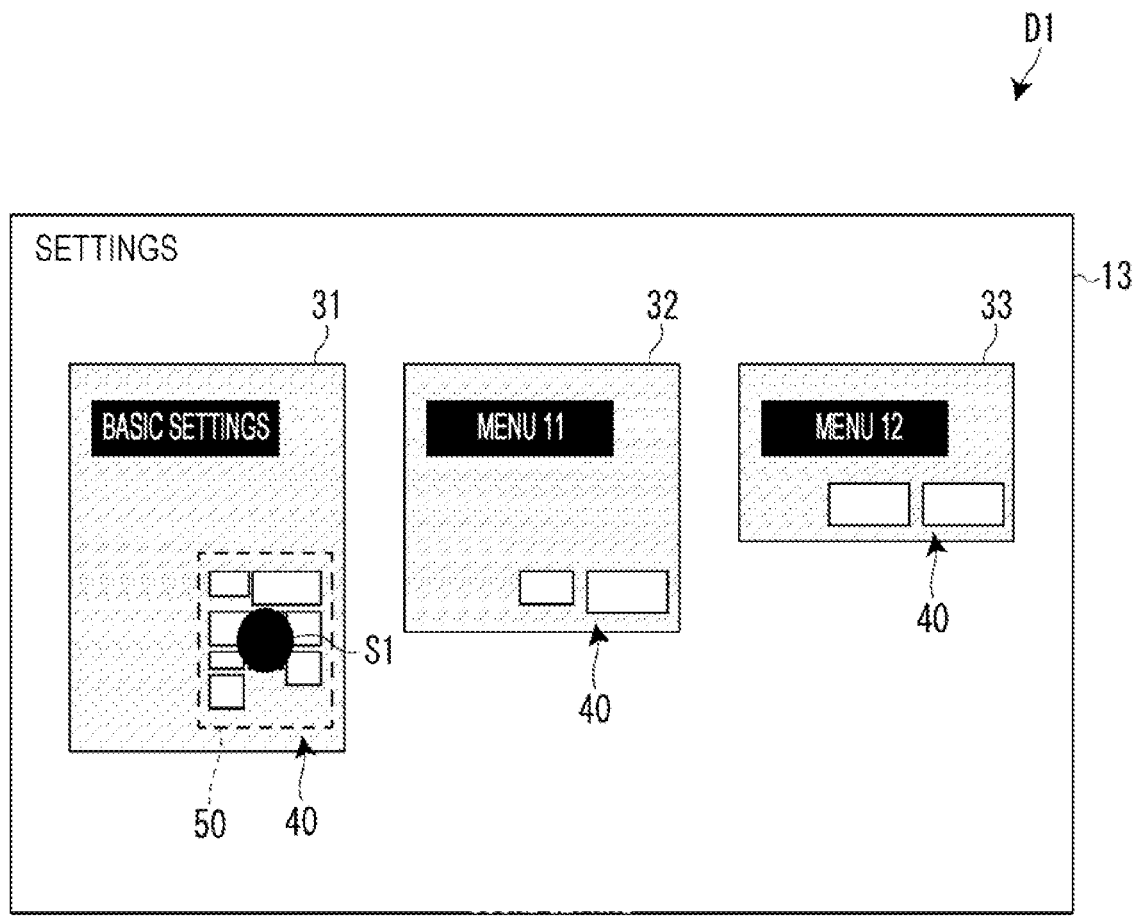
FIG. 9 illustrates a selected position in the thumbnail region of the tile of the "basic settings" menu according to Modification 1.
Figure 10:
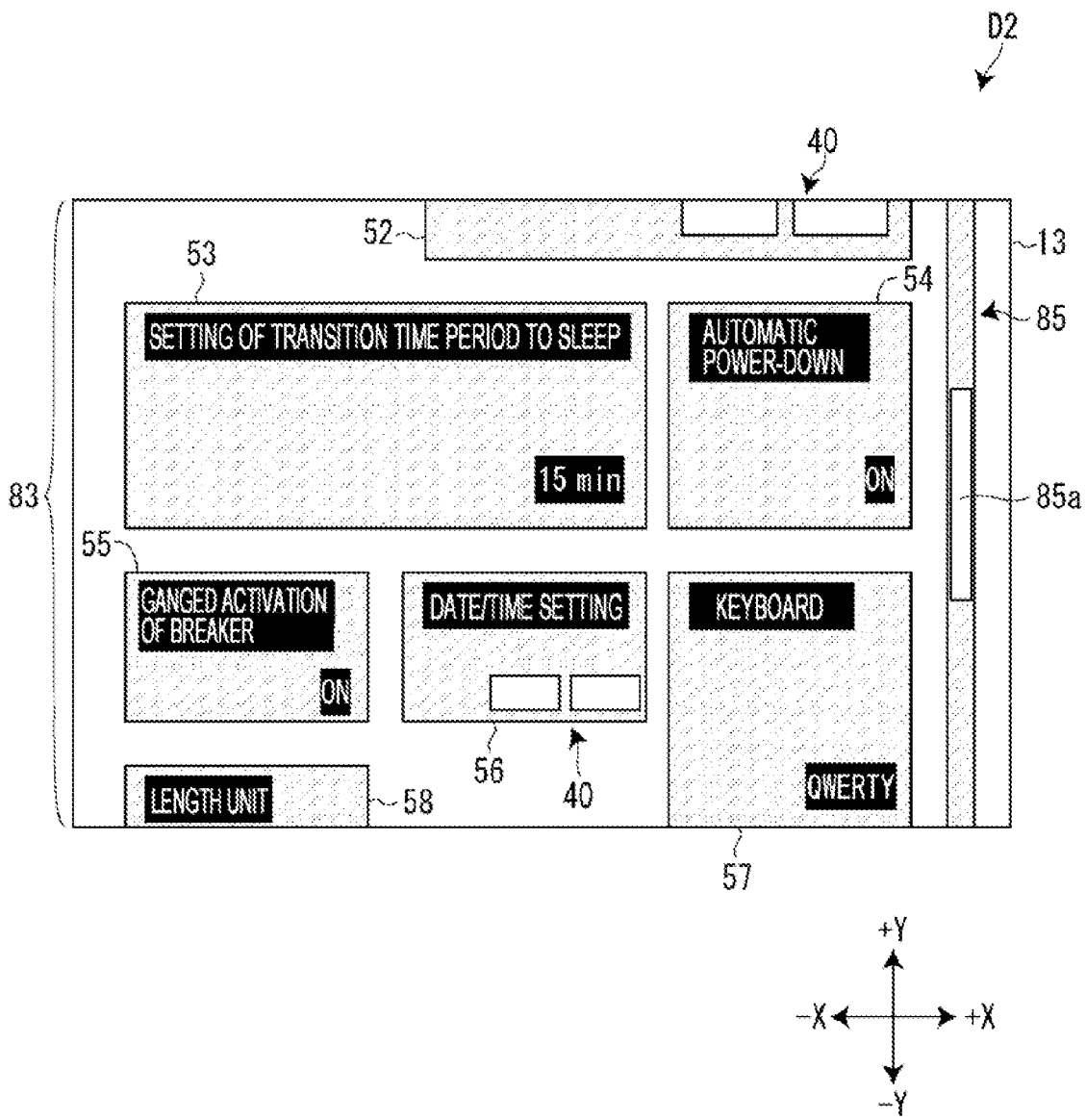
FIG. 10 illustrates an example of a display of the basic settings menu screen when the selected position illustrated in FIG. 9 is selected.

In the above-described embodiment, although the thumbnail region 50 of the tile 31 of the "basic settings" menu is divided into two regions of the first thumbnail region 71 and the second thumbnail region 72, the thumbnail region 50 may be divided into three or more regions in the Y direction. Additionally, the thumbnail region 50 may further be divided into smaller regions so that, for example, a selected position S1 on the tile arrangement thumbnail 40 displayed in the thumbnail region 50 coincides with a center of a display region of the basic settings menu screen D2 as illustrated in FIGS. 9 and 10. That is, a position to which the basic settings menu screen D2 is scrolled in the Y direction may be determined in accordance with the selected position S1 on the tile arrangement thumbnail 40. FIG. 9 illustrates an example in which the selected position S1 on the tile arrangement thumbnail 40 is substantially a center of the tile arrangement thumbnail 40, and FIG. 10 therefore illustrates an example in which a third menu region 83 is displayed that includes a portion on the −Y side of the first menu region 81 (see FIG. 6) of the basic settings menu screen D2 and a portion on the +Y side of the second menu region 82 (see FIG. 7).

Modification 2

Figure 11:
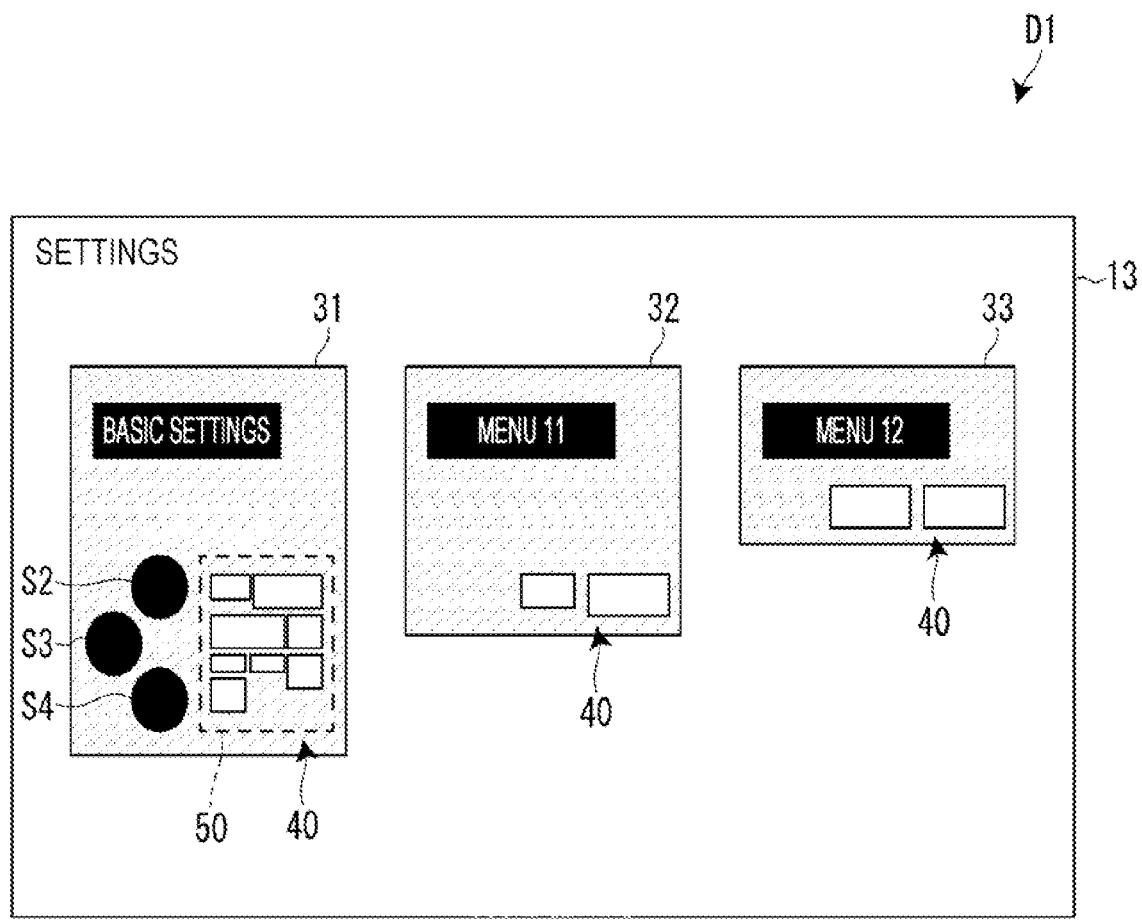
FIG. 11 illustrates a selected position in the tile of the "basic settings" menu according to Modification 2.

In the above-described embodiment, although when, among regions in the tile 31 of the "basic settings" menu, a region other than the thumbnail region 50 is selected, the first menu region 81 of the basic settings menu screen D2 is displayed, a selection region by which a display region of the basic settings menu screen D2 is determined may be extended outside the thumbnail region 50 in accordance with a selected position in the region other than the thumbnail region 50. Here, description will be given assuming that the selection region is extended leftward from the thumbnail region 50 and is divided into three regions in the Y direction. For example, when a selected position S2 is selected as illustrated in FIG. 11, in the tile arrangement thumbnail 40, a Y coordinate of the selected position S2 is regarded as being selected, and the first menu region 81 of the basic settings menu screen D2 may be displayed as illustrated in FIG. 6. Similarly, when a selected position S3 is selected, in the tile arrangement thumbnail 40, a Y coordinate of the selected position S3 is regarded as being selected, and the third menu region 83 of the basic settings menu screen D2 may be displayed as illustrated in FIG. 10. Similarly, when a selected position S4 is selected, in the tile arrangement thumbnail 40, a Y coordinate of the selected position S4 is regarded as being selected, and the second menu region 82 of the basic settings menu screen D2 may be displayed as illustrated in FIG. 7. Thus, a selection region is not limited to a region in the thumbnail region 50 and may be extended to a range in which the selection region is the whole or a portion of the tile and includes the thumbnail region 50.

Modification 3

In the above-described embodiment, although the case is illustrated where the basic settings menu screen D2 is capable of being scrolled in the Y direction of the basic settings menu screen D2 by the scroll bar 85, the screen may be capable of being scrolled not only in the Y direction but also in the X direction. In this case, the thumbnail region 50 is divided into a plurality of regions in the Y direction and in the X direction, and a display region of the basic settings menu screen D2 may be determined in accordance with which region has been selected. Furthermore, Modification 1 and Modification 2 may be applied to a scroll operation not in the Y direction but in the X direction.

Modification 4

Furthermore, when the tile 31 of the "basic settings" menu is selected, a transition to a display region of the basic settings menu screen D2 corresponding to a selected position in the tile 31 may be made not directly but gradually. For example, when the second thumbnail region 72 of the "basic settings" menu is selected, after the first menu region 81 of the basic settings menu screen D2 is temporarily displayed, the screen may be automatically scrolled to display the second menu region 82.

Modification 5

Furthermore, in the tile 31 of the "basic settings" menu, both when the first thumbnail region 71 of the thumbnail region 50 is selected and when the second thumbnail region 72 is selected, respective different positions to which the same screen is scrolled are not displayed, but respective different screens may be displayed. For example, the second screen to which a transition is made when the first thumbnail region 71 of the tile 31 of the "basic settings" menu is selected may differ from the third screen to which a transition is made when the second thumbnail region 72 is selected, and, when a region other than the thumbnail region 50 of the tile 31 of the "basic settings" menu is selected, a transition to a screen including the second screen and the third screen may be made.

Modification 6

In the above-described embodiment, although the case is illustrated where a menu is selected by using a rectangular tile because of a tiled menu, the shape of the tile does not necessarily have to be a rectangle. For example, a rounded rectangular or rhombus-shaped tile may be used. Furthermore, not a graphic generally referred to as "tile" but an icon-like tile referred to as "button" may be used as long as the tile is a graphic for selecting a menu. When a finger touches anywhere on "button", a display form of "button" may be changed by using a predetermined animation regardless of a touched position and may then be switched to a display corresponding to the touched position when the finger is lifted from "button".

Modification 7

In the above-described embodiment, although a partial region of the tile 31 of the "basic settings" menu serves as the thumbnail region 50, the whole region of the tile 31 may serve as the thumbnail region 50.

Modification 8

In the above-described embodiment, although the control unit 11 updates a frequency of use of each menu stored in the frequency-of-use storage region 16b when the "settings" menu is selected, the control unit 11 may update a frequency of use of each menu when the multifunction device 1 is turned on or when the user performs a predetermined operation. A frequency of use may be updated every time the user selects some menu. Furthermore, the same tile arrangement may be provided regardless of frequency of use.

Modification 9

In the above-described embodiment, the case is described where, only with respect to the tile 31 of the "basic settings" menu, the thumbnail region 50 is set. However, with respect to "menu 11" and "menu 12" other than the "basic settings" menu as well, thumbnail regions 50 are set, and display regions of respective subsequent hierarchical-level tiled menus may be changed in accordance with selected positions in the respective thumbnail regions 50. Furthermore, in a high hierarchical level ("top menu" in FIG. 2) above the first hierarchical level and in the second hierarchical level that is a low hierarchical level below the first hierarchical level as well, thumbnail regions 50 may be similarly set in respective tiles.

Modification 10

In the above-described embodiment, although, in the tile arrangement thumbnail 40, the control unit 11 does not display a menu name in each tile (see FIG. 3), the control unit 11 may display, in a portion of each tile, a menu name of a menu corresponding to the tile. Incidentally, with respect to the tile arrangement thumbnail 40 as well, when a tile area is small, the control unit 11 may omit displaying a menu name. Alternatively, the control unit 11 may reduce a font size of the menu name or may display only a portion of the menu name.

Modification 11

The above-described embodiment may be applied to an electronic device including a display unit other than the multifunction device 1. For example, "display control device" may be used for an electronic device, such as a printing device, a scanner device, a tablet, or a PC. Furthermore, in the case of a PC, for example, a liquid crystal display is used as a display unit that displays a tiled menu, a mouse is used as an operation unit through which the tiled menu is operated, and thus the display unit and the operation unit may be separate units.

Modification 12

In the above-described embodiment, although the case is illustrated where a tiled menu is displayed on the operation panel 13, the embodiment may also be applied to the case where a tiled menu is displayed as a virtual image by using a virtual reality (VR) device or the like.

Modification 13

A method of executing each process performed by the multifunction device 1 described in the above-described embodiment, a program for executing each process performed by the multifunction device 1, and a computer-readable storage medium storing the program are also included in the scope of rights of the present disclosure. Furthermore, a configuration may be provided in which the above-described embodiment and each modification are combined together. Additionally, for example, each process performed by the multifunction device 1 is implemented by causing hardware to operate in cooperation with software, and thus the present disclosure can be appropriately modified without departing from the gist thereof.

APPENDIX

Descriptions of a display control device and a storage medium will be appended below.

The multifunction device 1 includes the operation panel 13 configured to display, in a portion of a tile in a first-hierarchical-level tiled menu, a tile arrangement image of a second-hierarchical-level tiled menu to be displayed when the tile is selected; and the control unit 11 configured to, when any tile is selected from the first-hierarchical-level tiled menu, cause the operation panel 13 to display a second-hierarchical-level tiled menu corresponding to the selected tile.

A non-transitory computer-readable storage medium stores a program for causing the control unit 11 to execute a process. The process includes displaying, in a portion of a tile in a first-hierarchical-level tiled menu, a tile arrangement image of a second-hierarchical-level tiled menu to be displayed when the tile is selected; and displaying, when any tile is selected from the first-hierarchical-level tiled menu, a second-hierarchical-level tiled menu corresponding to the selected tile.

In this configuration, the multifunction device 1 causes a tile arrangement image of a second-hierarchical-level tiled menu to appear in a portion of a tile in the first-hierarchical-level tiled menu, and a user can therefore select, in an operation of making a transition from a first hierarchical level to a second hierarchical level, the tile by using the arrangement image displayed in the tile.

In the multifunction device 1, when the second-hierarchical-level tiled menu has to be subjected to a scroll operation to display all tiles, the control unit 11 may cause, in accordance with a selected position in a tile region of the tile selected from the first-hierarchical-level tiled menu, the operation panel 13 to display the second-hierarchical-level tiled menu scrolled to a position corresponding to the selected position.

In this configuration, the multifunction device 1 causes, in accordance with a selected position in the tile region of the tile selected from the first-hierarchical-level tiled menu, the second-hierarchical-level tiled menu scrolled to a position corresponding to the selected position to appear, and the user can therefore cause, by changing the selected position in the tile of the first hierarchical level, a desired position to which the second-hierarchical-level tiled menu is scrolled to appear quickly.

The multifunction device 1 includes the operation panel 13 configured to display a first screen that displays a first button serving as one button, a second screen, and a third screen; and the control unit 11 configured to, when a first region that is a portion of a button region of the first button is selected in the first screen, cause the operation panel 13 to display the second screen and configured to, when a second region that is a portion of the button region of the first button and differs from the first region is selected in the first screen, cause the operation panel 13 to display the third screen.

A non-transitory computer-readable storage medium stores a program for causing the control unit 11 to execute a process. The process includes displaying a first screen that displays a first button serving as one button; and displaying a second screen when a first region that is a portion of a button region of the first button is selected in the first screen and displaying a third screen when a second region that is a portion of the button region of the first button and differs from the first region is selected in the first screen.

In this configuration, the multifunction device 1 causes the second screen to appear when the first region of the first button is selected and causes the third screen to appear when the second region of the first button is selected, and the user can therefore cause a desired screen to appear quickly by changing a selected position in the first button.

In the multifunction device 1, the first screen may be a first-hierarchical-level screen, and the second screen and the third screen may constitute a second-hierarchical-level screen displayed by selecting the first button. The second-hierarchical-level screen may have to be subjected to a scroll operation to display all buttons included in the second-hierarchical-level screen. The second screen may be the second-hierarchical-level screen scrolled to a position corresponding to the first region, and the third screen may be the second-hierarchical-level screen scrolled to a position corresponding to the second region.

In this configuration, the second screen is the second-hierarchical-level screen scrolled to the position corresponding to the first region of the first button, the third screen is the second-hierarchical-level screen scrolled to the position corresponding to the second region of the first button, and the user can therefore cause, by changing a selected position in the first button, a desired position to which the second-hierarchical-level screen is scrolled to appear quickly.

What is claimed is:

1. A display control device comprising:
    a display unit configured to display a first-hierarchical-level tiled menu or a second-hierarchical-level tiled menu, wherein:
        the first-hierarchical-level tiled menu includes a first plurality of selectable tiles,
        the second-hierarchical-level tiled menu includes a second plurality of selectable tiles, and
        a portion of a particular tile in the first-hierarchical-level tiled menu includes a thumbnail image of the second-hierarchical-level tiled menu, wherein the thumbnail image of the second-hierarchical-level tiled menu is divided into a plurality of regions; and
    a display control unit configured to,
        cause the display unit to display the first-hierarchical-level tiled menu, and
        when a user-selected position is included in one of the regions, cause the display unit to display a region, which is corresponding to the one of the regions of the second-hierarchical-level tiled menu.

2. The display control device according to claim 1, wherein,
    when the second-hierarchical-level tiled menu has to be subjected to a scroll operation to display all tiles as a whole,
    the display control unit causes, in accordance with a selected position in a tile region of the tile selected from the first-hierarchical-level tiled menu, the display unit to display the second-hierarchical-level tiled menu scrolled to a position corresponding to the selected position.

3. A display control device comprising:
a display unit configured to display a first screen, a second screen, and a third screen, wherein the first screen includes a first selectable region and a second selectable region that is different from the first selectable region; and
a display control unit configured to,
when the first selectable region of the first screen is selected, cause the display unit to display the second screen, and,
when the second selectable region of the first screen is selected, cause the display unit to display the third screen,
wherein:
the first selectable region of the first screen includes a thumbnail image of the second screen, and the second selectable region of the first screen includes a thumbnail image of the third screen, and each of the second screen and the third screen includes one or more selectable regions,
when the first screen is displayed, the thumbnail image of the second screen is divided into a plurality of regions,
when a particular region of the thumbnail image of the second screen is selected, the display unit displays the second screen corresponding to the particular region of the thumbnail image of the second screen,
when the second screen is displayed, the thumbnail image of the third screen is divided into a plurality of regions,
when a particular region of the thumbnail image of the third screen is selected, the display unit displays the third screen corresponding to the particular region of the thumbnail image of the third screen.

4. The display control device according to claim 3, wherein
the first screen is a first-hierarchical-level screen, and the second screen and the third screen constitute a second-hierarchical-level screen displayed by selecting the first selectable region,
wherein the second-hierarchical-level screen has to be subjected to a scroll operation to display all buttons included in the second-hierarchical-level screen, and
wherein the second screen is the second-hierarchical-level screen scrolled to a position corresponding to the first region, and the third screen is the second-hierarchical-level screen scrolled to a position corresponding to the second region.

5. A non-transitory computer-readable storage medium storing a program for causing a computer to execute a process, the process comprising:
displaying a first-hierarchical-level tiled menu including a first plurality of selectable tiles, wherein a portion of a particular tile in the first-hierarchical-level tiled menu includes a thumbnail image of a second-hierarchical-level tiled menu including a second plurality of selectable tiles, wherein the thumbnail image of the second-hierarchical-level tiled menu is divided into a plurality of regions; and
when a particular region among the plurality of regions of the thumbnail image of the second-hierarchical-level tiled menu is selected from the first-hierarchical-level tiled menu, displaying a region of the second-hierarchical-level tiled menu corresponding to the particular region of the thumbnail image on an entire display.

6. A non-transitory computer-readable storage medium storing a program for causing a computer to execute a process, the process comprising:
displaying a first screen that includes a first selectable region and a second selectable region that is different from the first selectable region; and
displaying a second screen when the first selectable region of the first screen is selected and displaying a third screen when the second selectable region of the first screen is selected,
wherein:
the first selectable region of the first screen includes a thumbnail image of the second screen, and the second selectable region of the first screen includes a thumbnail image of the third screen, and each of the second screen and third screen includes one or more selectable regions,
at least one of the thumbnail image of the second screen and the thumbnail image of the third screen is divided into a plurality of regions,
when a particular region of the plurality of regions of the thumbnail image is selected, a region of the second screen or the third screen corresponding to the particular region of the thumbnail image is displayed on an entire display.

* * * * *